(12) United States Patent
    Goodman et al.

(10) Patent No.: US 9,093,835 B2
(45) Date of Patent: Jul. 28, 2015

(54) LIQUID ACTIVATED FAILSAFE FOR PORTABLE COMPUTING DEVICES

(71) Applicant: Apple Inc., Cupertino, CA (US)

(72) Inventors: Daniel Goodman, Boston, MA (US); Paul Lazarescu, Boston, MA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 13/748,353

(22) Filed: Jan. 23, 2013

(65) Prior Publication Data

US 2014/0203665 A1    Jul. 24, 2014

(51) Int. Cl.
  *H02H 5/08*    (2006.01)
  *H01H 45/00*   (2006.01)

(52) U.S. Cl.
  CPC ............. *H02H 5/083* (2013.01); *Y10T 307/779* (2015.04)

(58) Field of Classification Search
  USPC ........................................................ 307/118
  See application file for complete search history.

(56) References Cited

U.S. PATENT DOCUMENTS

| 4,410,924 A | 10/1983 | Hewitt et al. |
| 5,124,679 A | 6/1992 | Kanazawa |

FOREIGN PATENT DOCUMENTS

| EP | 0716623 B1 | 4/2002 |
| EP | 2117095 A1 | 11/2009 |
| JP | 2005311637 A | 4/2005 |

*Primary Examiner* — Robert Deberadinis
(74) *Attorney, Agent, or Firm* — Downey Brand LLP (57) ABSTRACT

The described embodiments relate generally to portable computing devices such as notebook computers and more particularly to failsafe mechanisms designed to prevent electrical shorts in the event that a portable computing device comes in contact with a liquid. A plurality of liquid sensors can be positioned within a computing device and electrically coupled to a controller. The controller can respond to varying amounts of liquid by immediately decoupling the system electronics from the power supply, performing a controlled shut-down of the computing device, or taking no action. In some embodiments, the controller can also limit the ability of a user to reactivate the computing device following a spill until any remaining liquids are removed from the computing device.

25 Claims, 11 Drawing Sheets

LIQUID ACTIVATED FAILSAFE FOR PORTABLE COMPUTING DEVICES

FIELD OF THE DESCRIBED EMBODIMENTS

The described embodiments relate generally to portable computing devices such as notebook computers and more particularly to failsafe mechanisms designed to prevent electrical shorts in the event that a portable computing device comes in contact with a liquid.

BACKGROUND

During use of a portable computing device resting on a desk or other horizontal surface, the keyboard and I/O ports of the computing device can allow a spilled liquid to enter into the interior of the device. If some measure is not taken to prevent the spilled liquid from flowing through these openings, the liquid can reach system electronics including circuit boards, processors, drives, and the like that are critical to the operation of the computing device. When liquid reaches these components, an electrical short can be created, severely damaging the electronics.

One method of preventing spilled liquid from creating an electrical short can include sealing off openings in the keyboard and I/O ports from underlying system electronics or creating structures to divert spilled liquid from the openings to a location in the computer where the liquid will not cause an electrical short. However, these methods can be ineffective when large amounts of liquid are spilled. Moreover, the addition of seals and diverting structures can increase the cost, size, and weight of the portable computing device in which they are included. Another method of preventing spilled liquid from creating an electrical short involves placing one or more sensors within the computing device that can sense when liquid is present and cut power to the device. However, this method can result in unwanted losses of power. For instance, the sensors can be triggered by small amounts of liquid, moisture, or spills in non-critical areas. This can lead to an unnecessary loss of data when the computing device shuts down unnecessarily.

Therefore, what is desired is a way of sensing whether a particular spill is likely to cause damage to the system electronics of a portable computing device and causing the computer to take the best course of action depending on the amount and location of the spilled liquid.

SUMMARY OF THE DESCRIBED EMBODIMENTS

This paper describes various embodiments that relate to detecting and responding to the presence of liquids in a computing device. In one embodiment, a portable computing device is described. The computing device can include a base housing with a number of openings for a keyboard, I/O ports, and other components. A plurality of liquid sensors can be placed near the openings in the base housing and configured to detect any liquid entering the computing device. Furthermore, these liquid sensors can be connected to a controller that continuously monitors the readings from the liquid sensors and can send instructions to system electronics and a power supply. The controller can be configured to electrically decouple the system electronics from the power supply when a number of liquid sensors exceeding a moisture threshold exceeds a first limit.

In another embodiment, a method is described for detecting and responding to spilled liquids that enter a portable computing device. The method includes at least the following steps: (1) providing a plurality of liquid sensors near openings in a base housing of the computing device, (2) electrically coupling the liquid sensors to a controller, (3) monitoring each of the liquid sensors to detect when one or more of the sensors exceeds a moisture threshold, (4) determining whether the number of liquid sensors exceeding the moisture threshold exceeds a first limit, (5) determining whether the number of liquid sensors exceeding the moisture threshold exceeds a second limit, (6) in the event that the number of liquid sensors exceeding the moisture threshold exceeds the second limit, immediately decoupling any system electronics from a power supply, and (7) in the event that the number of liquid sensors exceeding the moisture threshold exceeds the first limit but not the second limit, saving any data that a user of the computing device is working with and performing a controlled shutdown of the computing device.

In yet another embodiment, a non-transient computer readable medium for storing computer code executable by a processor in a computer system capable of detecting and responding to the presence of liquids in a computing device is described. The non-transient computer readable medium contains at least the following: (1) computer code for monitoring each of a plurality of liquid sensors to detect when one or more of the liquid sensors exceeds a moisture threshold, (2) computer code for determining whether a number of liquid sensors exceeding the moisture threshold exceeds a first limit, (3) computer code for determining whether the number of liquid sensors exceeding the moisture threshold exceeds a second limit, (4) computer code for immediately decoupling any system electronics from a power supply in the event that the number of liquid sensors exceeding the moisture threshold exceeds the second limit, and (5) computer code for saving any data that a user of the computing device is working with and performing a controlled shutdown of the computing device in the event that the number of liquid sensors exceeding the moisture threshold exceeds the first limit but not the second limit.

In still another embodiment, a system for detecting and responding to the presence of spilled liquids in a computing device is described. The system includes a plurality of capacitive liquid sensors distributed throughout the computing device, system electronics, and a power supply. A controller is also provided and is electrically coupled to the liquid sensors, power supply, and system electronics. Furthermore, the controller is configured to electrically decouple the system electronics from the power supply when a number of liquid sensors exceeding a moisture threshold exceeds a first limit.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Portable computing devices can contain a variety of openings that can allow spilled liquids to enter into the interior of the device. For example, gaps between the keys in a keyboard assembly, speaker ports, I/O ports, and air vents for cooling fans can all allow liquids to pass into the interior spaces of the device. The interior of the portable computing device can include system electronics, including circuit boards, integrated circuits, drives, and other electronics. When these system electronics come in contact with liquids, an electrical short can occur, damaging the electronics and causing the device to malfunction.

Several methods are described for detecting the presence of a liquid spill and determining the size and location of the spill relative to critical system electronics. Depending on the location and severity of the spill, a controller within the computing device can direct the device to take different actions. For example, the controller can respond to a major spill or a spill near a critical system component by immediately decoupling the system electronics from the power supply, preventing an electrical short from occurring. However, a minor spill or spill in a non-critical area of the device can cause the device to perform a controlled shutdown procedure, saving any data that a user is working with so the data can be retrieved at a later time. Furthermore, the controller can limit the ability of a user to power the device on until the spilled liquid has dried or evaporated and the device can safely be used without risking an electrical short.

Figure 1:
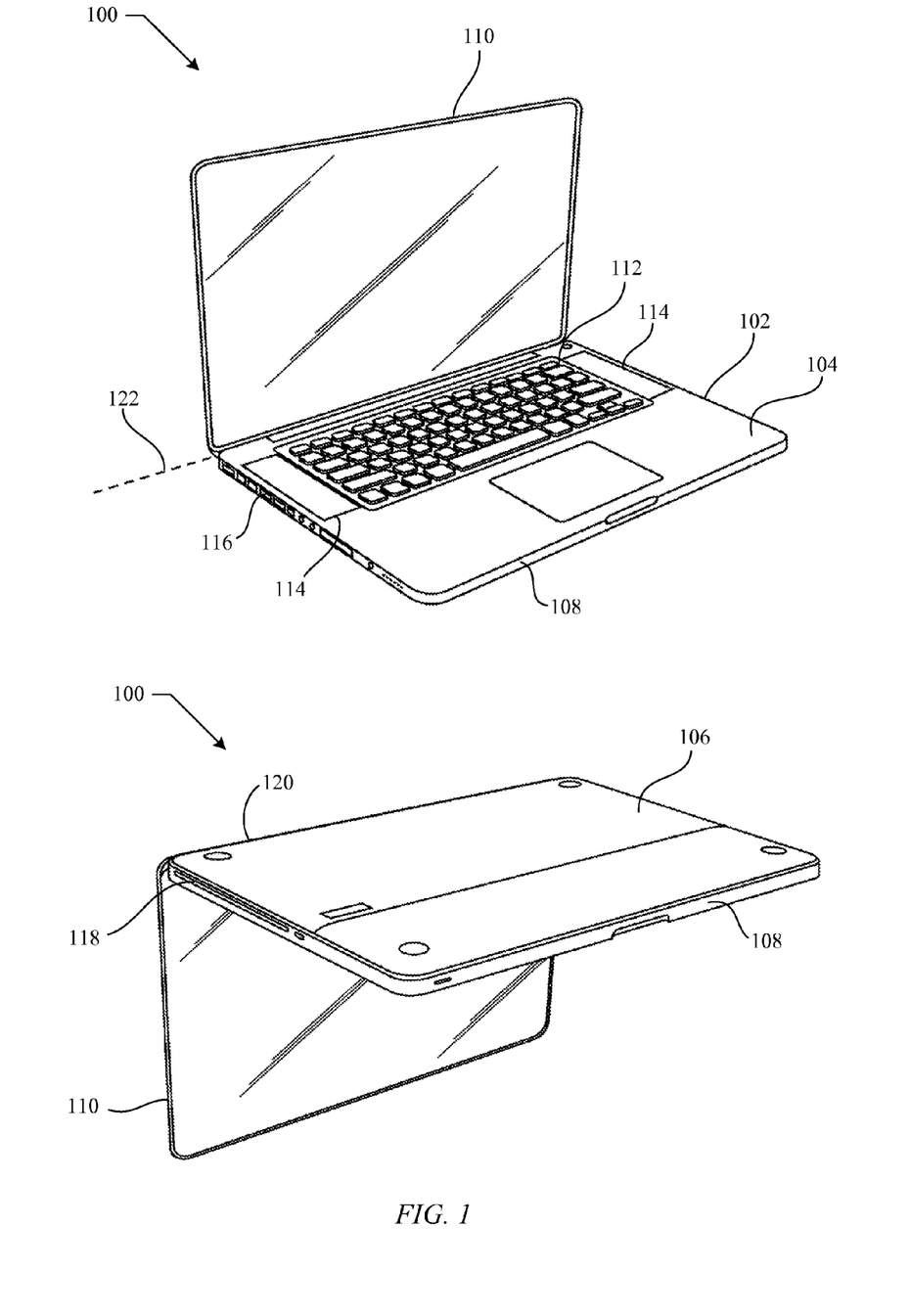
FIG. 1 shows a computing device capable of implementing a liquid failsafe system.

FIG. 1 shows representative computing device 100 capable of incorporating the present invention. Computing device 100 can include base housing 102 and lid 110. Base housing 102 can include a hollow space formed by horizontal top surface 104, horizontal bottom surface 106 and vertical side walls 108. In one embodiment, side walls 108 can be integrally included in either top surface 104 or bottom surface 106. Lid 110 can include a display assembly and can be rotably attached to base housing 102 along rotational axis 122. Base housing 102 can enclose a variety of system electronics necessary for the operation of computing device 100. For example, the interior of base housing 102 can include a mother board, other circuit boards, drives, memory, batteries, and various other electronic components.

Several openings can be included in base housing 102 that can allow any liquid spilled on or around computing device 100 to enter the interior of base housing 102. Keyboard assembly 112 can include spaces between individual keys and housing 102 that can allow a liquid to pass through. Furthermore, some variations of computing device 100 can include audio speakers 114. Audio speakers 114 can include a perforated membrane along a surface of base housing 102 to allow sound to pass through. These perforations can also allow any liquid that is spilled in the vicinity of audio speakers 114 to enter base housing 102. Additionally, openings can be included in side walls 108 of base housing 102. Openings 116 can represent a variety of I/O ports typically included in a portable computer device. For example, openings 116 can include USB ports, power jacks, ethernet ports, firewire ports, HDMI ports, display ports, audio jacks, and any other type of connector receptacle. In addition, side walls 108 can include openings for disc drives such as optical drive opening 118. Finally, side walls 108 can include air vents 120 for providing inlets and outlets for a cooling fan contained within base housing 102. These openings in side walls 108 can provide additional means for spilled liquids to enter base housing 102 and cause damage to the system electronics contained within.

Figure 2:
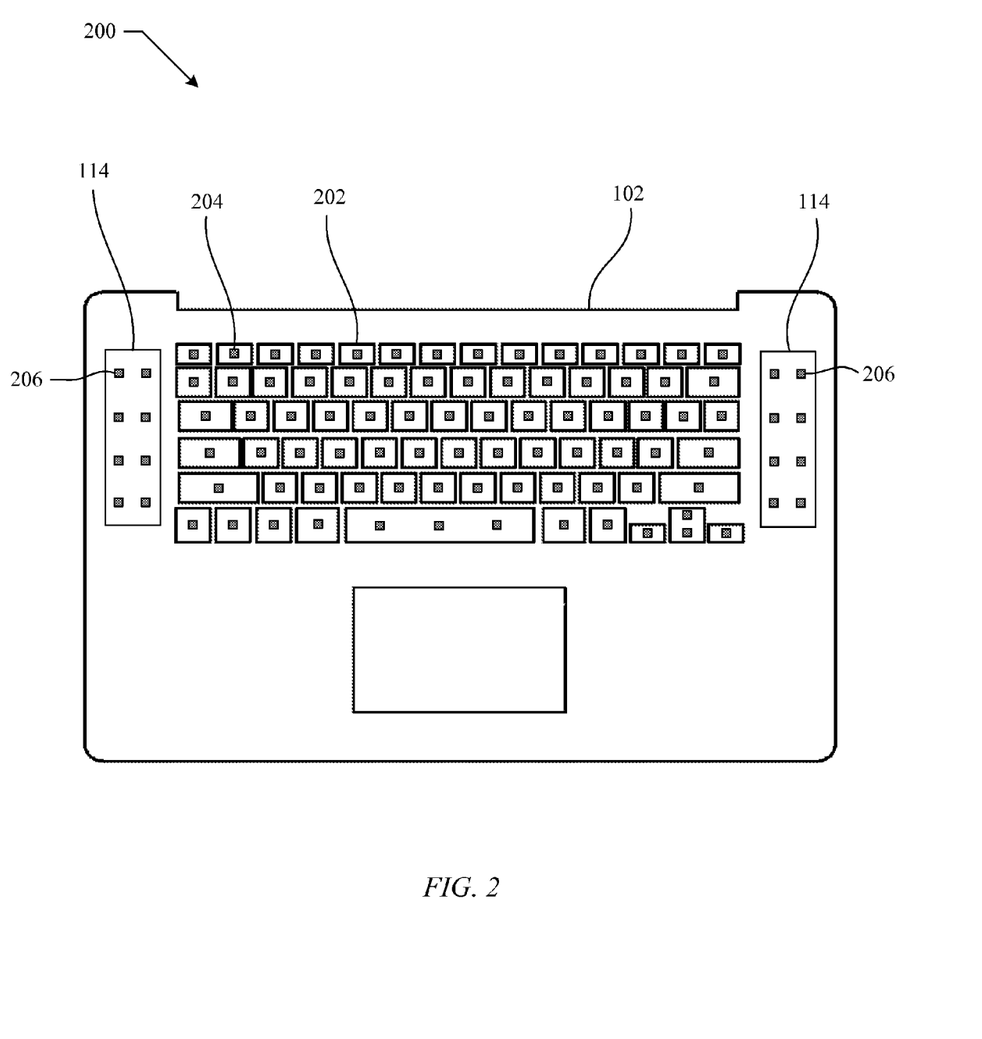
FIG. 2 shows a plan view of a base housing of a computing device, illustrating a representative array of liquid sensors.

FIG. 2 shows a top view of computing device 200. Keyboard assembly 202 is located on an upper surface of base housing 102. In one embodiment, an opening can be provided in base housing 102 for keyboard assembly 202. In another embodiment, a plurality of openings can be provided in an upper surface of base housing 102 and each key in keyboard assembly 202 can protrude from a different opening. A grid of liquid sensors 204 can be positioned under or within keyboard assembly 202 and configured to detect the presence of liquid. Liquid sensors 204 can take on a variety of shapes and forms. In one embodiment, liquid sensors 204 can include a grid of capacitive sensors. Capacitive sensors can detect a change in capacitance when the sensor comes in contact with liquids or humidity and send an electrical signal to a controller. The signal can inform the controller of the magnitude of the change in capacitance. In this way, the controller can determine whether the signal represents a small amount of liquid or humidity that poses a small risk to the underlying system electronics or a large spill that can result in an electrical short.

Various other types of sensors can be used as well. In another embodiment, resistive sensors can be used to sense the presence of water. In yet another embodiment, conductive sensors can be used. However, passive sensors such as capacitive and resistive sensors can be preferable to active sensors such as conductive sensors as they do not require current to pass through the sensor and can draw less power than passive sensors. In still another embodiment, optical sensors can be used to sense the presence of water. Many portable computing devices can include lights such as LEDs to provide a backlight for keyboard assembly 112. Optical sensors can be included behind keyboard assembly 112 and can detect any variation in light emitted by the backlight due to liquids in the vicinity of the optical sensors. The size and locations of liquid sensors 204 can be varied. In one embodiment, sensors 204 can be positioned under each individual key in keyboard assembly 202. In another embodiment, liquid sensors 204 can be positioned under spaces between the keys in keyboard assembly 202. Alternatively, liquid sensors 204 can be positioned in a regular grid regardless of the location of the keys in keyboard assembly 202.

Figure 3:
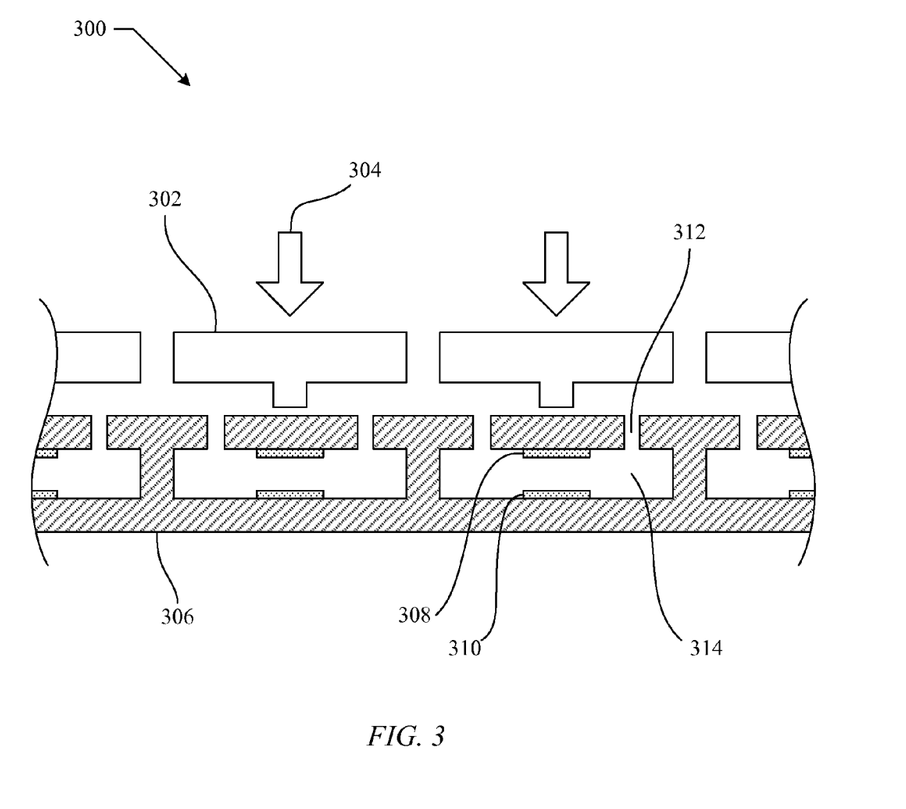
FIG. 3 shows a cross-sectional view of a keyboard assembly.

FIG. 3 shows a cross-sectional view of keyboard assembly 300, demonstrating an alternative method of sensing liquids using existing keyboard components. Keyboard assembly 300 can include keys 302 and flexible membrane 306. Flexible membrane 306 can include an upper layer, a lower layer, and several side walls forming cavities 314 corresponding to each individual key. Each cavity 314 can include upper electrode 308 and lower electrode 310. When force 304 is exerted on keys 302, keys 302 can impart a force on flexible membrane 306, causing cavity 314 to collapse and electrodes 308 and 310 to come into contact with each other. This can complete a circuit, sending a signal to a keyboard controller indicating that the key has been depressed. Typically, cavities 314 are sealed so that liquids and other foreign materials do not interfere with contact between electrodes 308 and 310. However, in keyboard assembly 300, openings 312 can be provided in an upper layer of flexible membrane 306. Openings 312 can allow any liquid spilled onto keyboard assembly 300 to enter cavities 314. When cavities 314 fills with a liquid, the liquid can act as a dielectric, allowing a capacitance value to be measured between upper electrode 308 and lower electrode 310. By monitoring the capacitance values between electrodes 308 and 310 for each of the keys in keyboard assembly 300, the controller can sense when a spill has occurred and the location of the spill.

Figure 4:
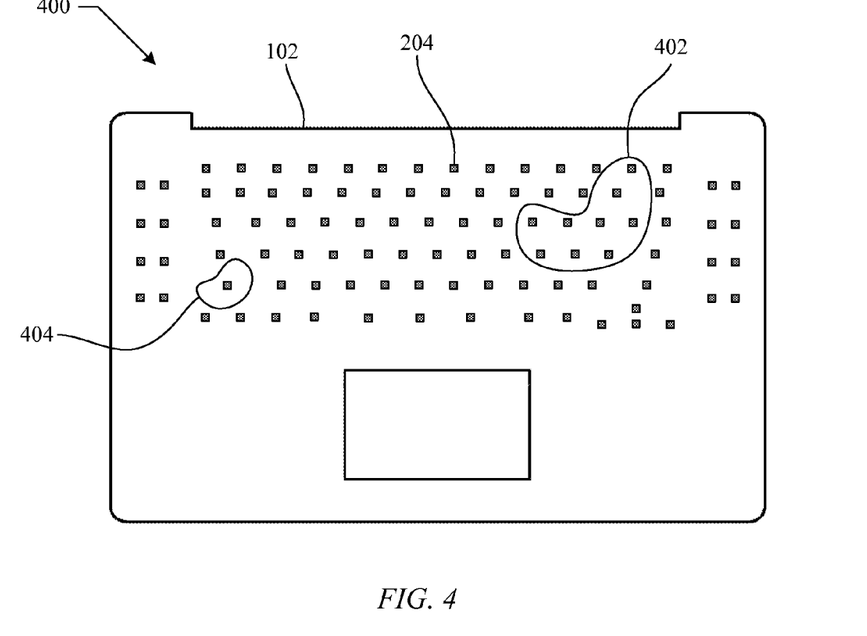
FIG. 4 shows a plan view of an array of liquid sensors housed within a computing device.

FIG. 4 shows a top view of computing device 400, demonstrating how a grid of liquid sensors 204 can distinguish between different sizes of spills. Keyboard assembly 112 is not shown for clarity. Liquid sensors 204 can be arranged in a grid underneath keyboard assembly 112 and other openings in the upper surface of base housing 102 such as audio speakers 114. Liquid sensors 204 can represent capacitive sensors, resistive sensors, conductive sensors, optical sensors, or any other technically feasible sensor capable of sensing the presence of liquids. Furthermore, liquid sensors 204 can be arranged in a variety of locations and patterns. In one embodiment, liquid sensors 204 can be incorporated into individual keys in keyboard assembly 202. In another embodiment, liquid sensors 204 can be located below or between the keys in keyboard assembly 202. In still another embodiment, liquid sensors 204 can be included in the key depression sensing electrodes as is described in keyboard assembly 300 shown in FIG. 3.

Liquid sensors 204 can be electrically coupled to a controller that is configured to receive electrical signals when liquid sensors 204 come into contact with a liquid such as water. The controller can sense the size and severity of a spill by analyzing the signals received from liquid sensors 204. For example, in one embodiment, liquid sensors 204 can represent a grid of capacitive sensors. By measuring the capacitance value of each of liquid sensors 204, the controller can detect whether the sensor is in contact with liquid or moisture and the quantity of liquid present. A threshold can be set at a predetermined capacitance value to determine whether any liquid or moisture present represent a danger to computing device 400. For example, the threshold can be configured to direct computing device 400 to take active measures to avoid damage when a large amount of liquid is indicated by the capacitance value while taking no action when the capacitance value indicates a small amount of liquid or moisture.

In addition, the controller can take different actions based on the number of liquid sensors 204 that indicate contact with liquid simultaneously. For example, region 402 can represent an area in which liquid is present following a major spill, while region 404 can represent an area in which liquid present following a minor spill. A threshold number of sensors can be set to determine the action taken by the controller in response to the spill. In one embodiment, a threshold of three sensors can be used. For example, when three or more of liquid sensors 204 are triggered simultaneously, the controller can interpret the event as a major spill and take appropriate action such as immediately decoupling the system electronics from the power supply. However, when less than three of liquid sensors 204 are triggered simultaneously, the controller can direct the computing device to engage in a controlled shutdown procedure. This can save any of the user's data that has not been saved to the hard drive at the time of the spill.

In another embodiment, a second threshold can be set, below which no action is taken by the controller. For example, if only one of sensors 204 is triggered, the controller can take no action. The number of sensors required to reach the threshold can depend on several factors. For example, a computing device with substantial structures in place to prevent liquids from passing through keyboard assembly 112 and coming into contact with the system electronics can have a relatively high threshold. Similarly, a computing device with little or no structures in place between keyboard assembly 112 and the system electronics can have a relatively low threshold.

Figure 5:
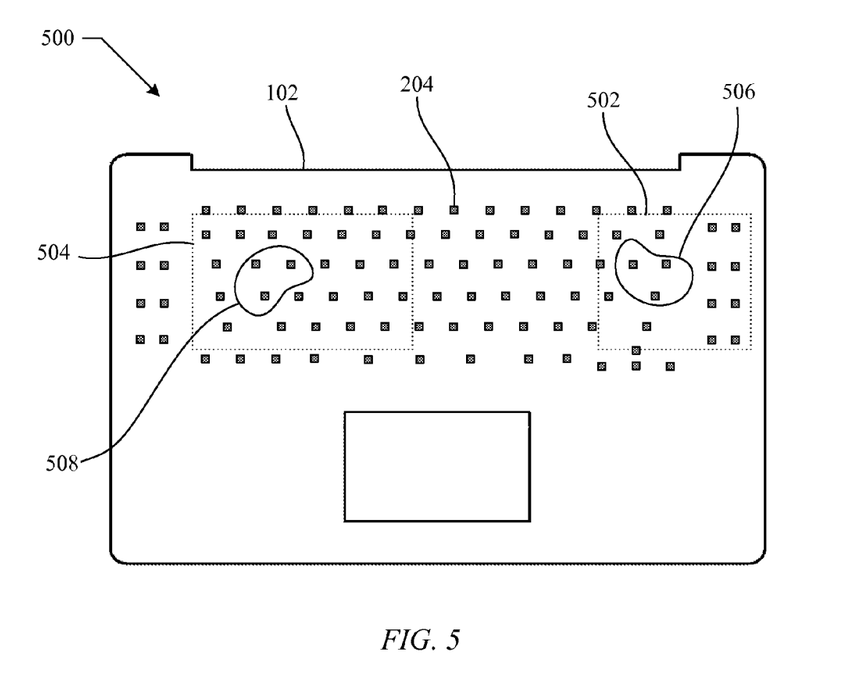
FIG. 5 shows a plan view of an array of liquid sensors and underlying system electronics housed within a computing device.

FIG. 5 shows a top view of computing device 500, demonstrating how a grid of liquid sensors 204 can distinguish between spills in different locations. Regions 502 and 504 can represent the locations of various components of the system electronics disposed below keyboard assembly 112 and liquid sensors 204. For example, region 504 can represent the location of a component that his highly sensitive to the presence of liquid, such as a motherboard or processor. On the other hand, region 502 can represent a component that is relatively less sensitive to the presence of liquids, such as an optical drive or speaker. Different threshold values can be assigned to regions 502 and 504 depending on the sensitivity of the underlying system electronics to liquids. For example, in one embodiment, a threshold value of 2 can be assigned to region 504 and a threshold value of 4 can be assigned to region 502. In this case, spill 508 can trigger 3 liquid sensors 204 in region 504, exceeding the threshold and causing the controller to cut power to computing device 500. Spill 506 can also trigger 3 liquid sensors 204. However, because spill 506 is located in region 502, spill 506 can be considered a minor spill event and the controller can react by engaging in a controlled shutdown procedure, saving any data that the user is working with at the time of the spill event. Computing device 500 can include any number of regions similar to regions 502 and 506 and each region can have a different threshold depending on the susceptibility of the underlying components to damage from contact with liquids.

Figure 6:
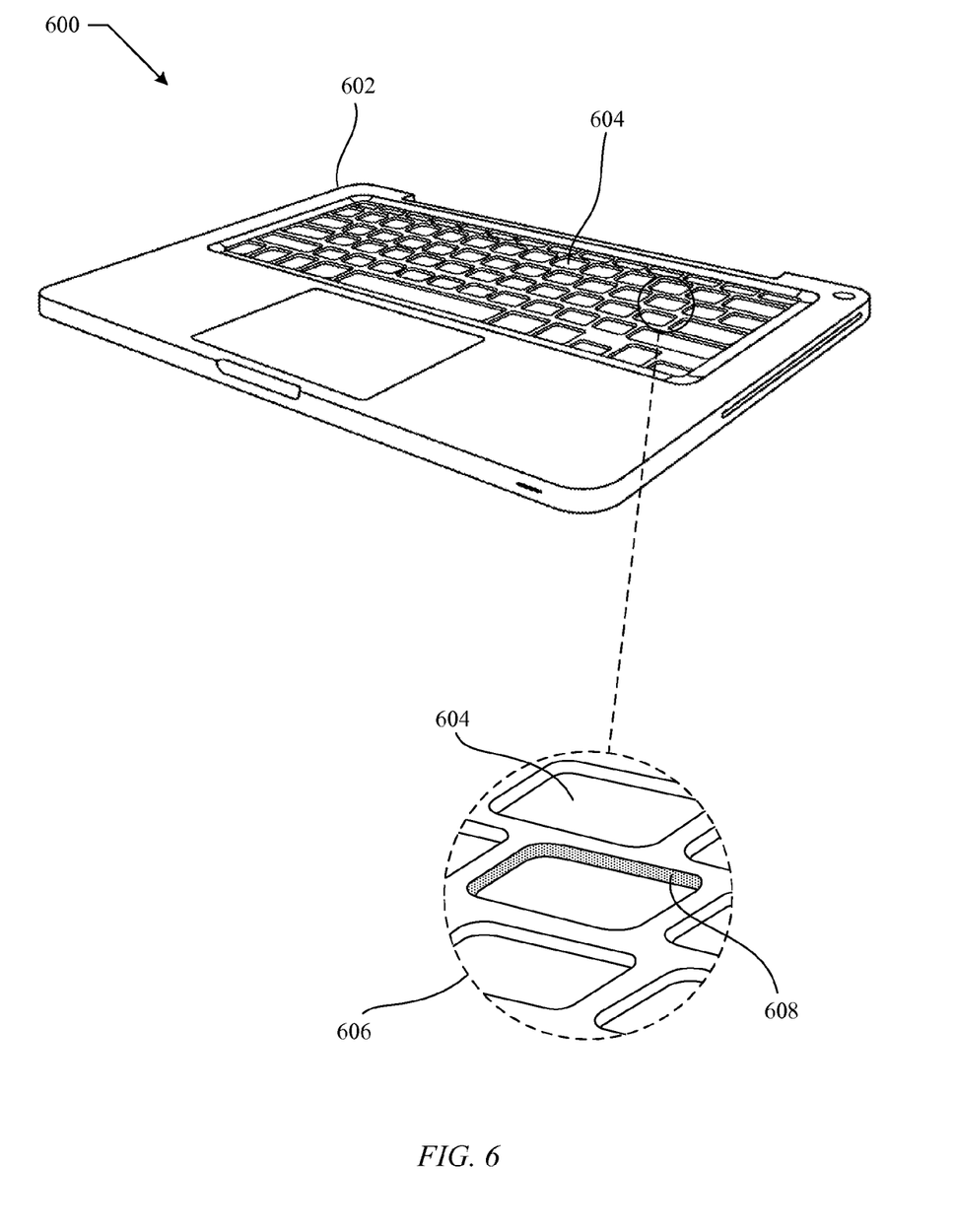
FIG. 6 shows a top case of a base housing for a computing device including ribbon sensors in openings for a keyboard assembly.

FIG. 6 shows case assembly 600, demonstrating an alternative method of sensing the presence of liquid near the keyboard assembly. Top case 602 can form a top surface of base housing 102. In one embodiment, top case 602 can include a plurality of openings 604 through which individual keys from keyboard assembly 112 (not shown) can protrude. Magnified view 606 shows a detailed view of openings 604. Each of openings 604 can include ribbon sensor 608, located along a periphery of the interior surfaces of openings 604. Ribbon sensors 608 can be mechanically coupled to top case 602 using an adhesive or any other technically feasible means. Ribbon sensors 608 can represent a variety of types of sensors. In one embodiment, ribbon sensors 608 can include capacitive sensors. However, any technically feasible liquid sensor can be used including resistive, conductive, and optical sensors. Each of ribbon sensors 608 can be electrically coupled to the controller. The controller can monitor the capacitance values across each of ribbon sensors 608 and can respond by initiating actions such as those described in FIG. 4 and FIG. 5.

Figure 7:
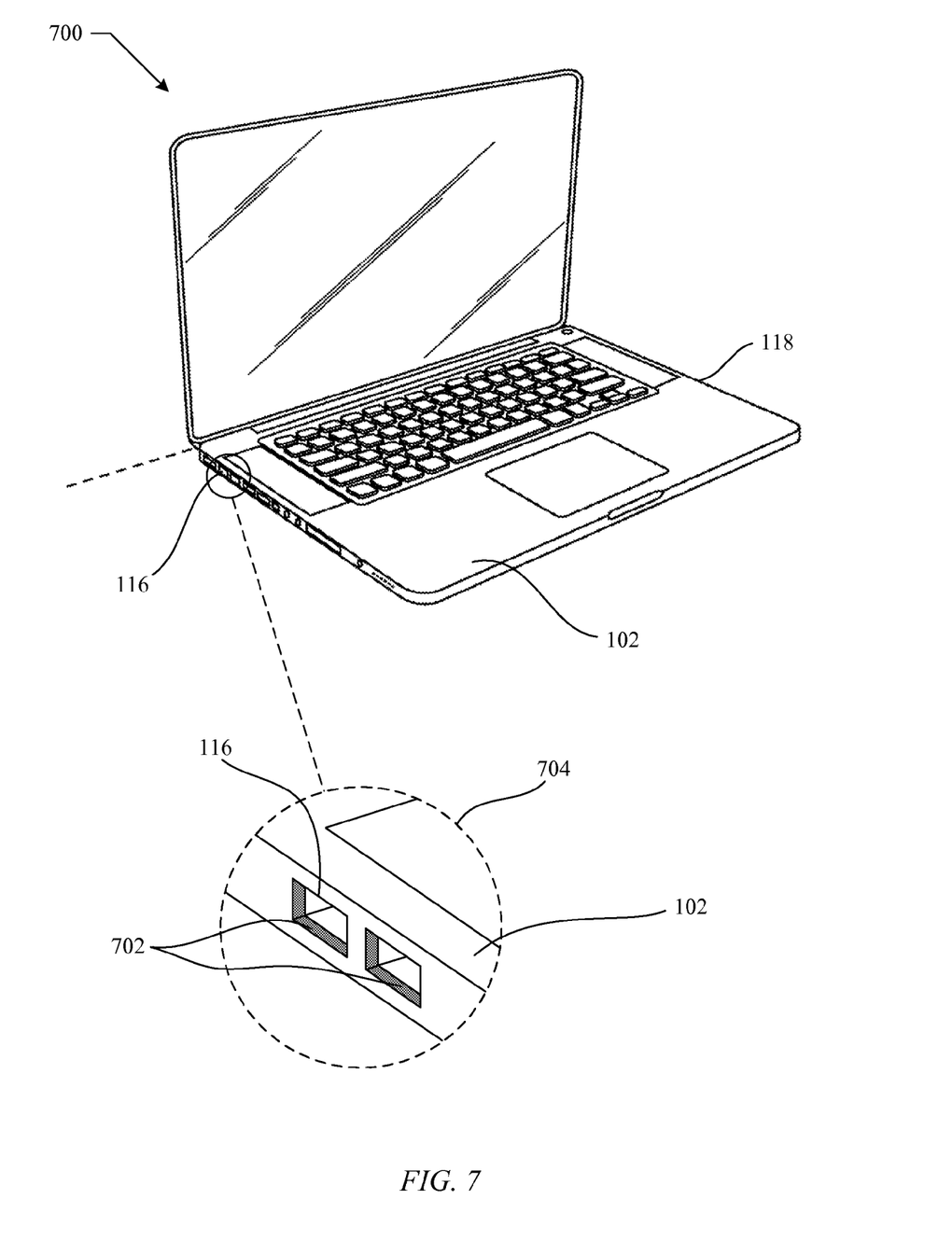
FIG. 7 shows a computing device including ribbon sensors located near a variety of openings in a base housing.

FIG. 7 shows computing device 700, demonstrating how ribbon sensors 702 can be used to detect the presence liquids in areas other than keyboard assembly 112. Openings 116 can be provided in base housing 102 to accommodate a variety of I/O ports including USB ports, power jacks, ethernet ports, firewire ports, HDMI ports, display ports, audio jacks, and any other type of connector receptacle. Magnified view 704 shows a detailed view of a representative opening 116. Ribbon sensors 702 can be located within each of openings 116 positioned along a periphery of an interior edge. Similar to ribbon sensors 608, ribbon sensors 702 can represent any technically feasible liquid sensor including capacitive sensors, resistive sensors, conductive sensors, and optical sensors. Furthermore, ribbon sensors 702 can be mechanically coupled to base housing 102 and can be electrically coupled to the controller. In addition to I/O ports, ribbon sensors 702 can be applied to any other openings in base housing 102 that can allow liquid to enter and come in contact with the system electronics. For example, ribbon sensors 702 can be placed around openings in base housing 102 designed to accommodate optical drive 118 or inlets and outlets providing airflow for cooling fans.

Figure 8:
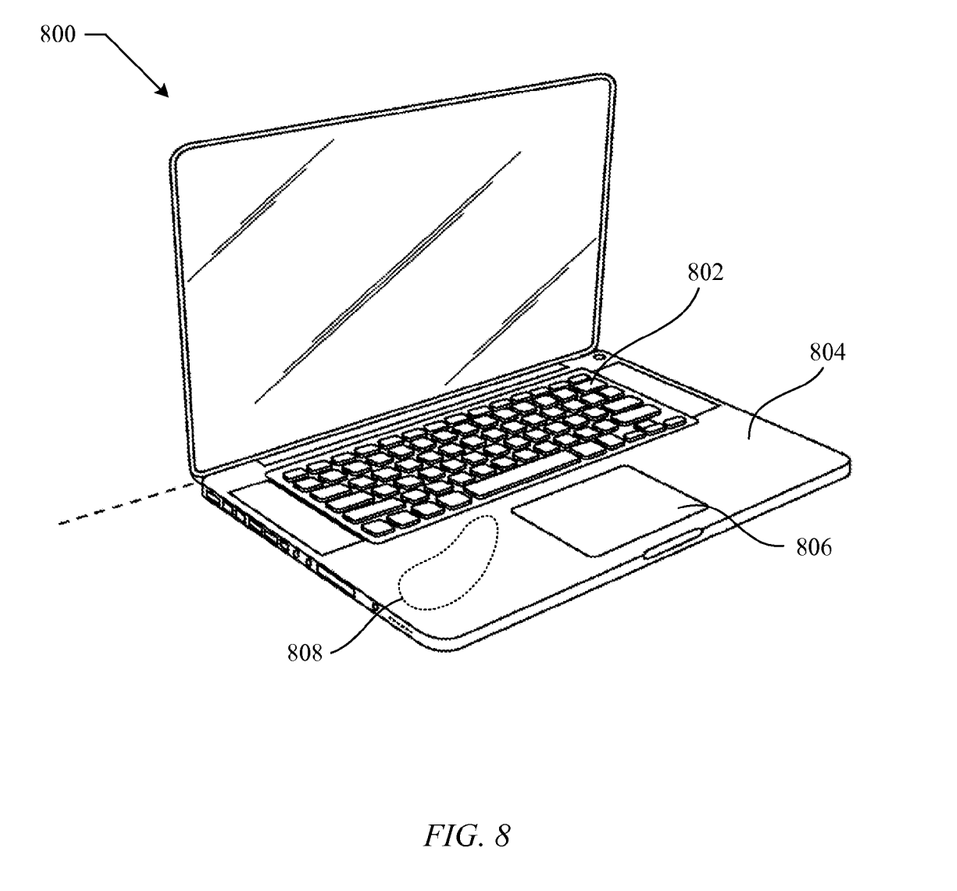
FIG. 8 shows a computing device with a base housing capable of detecting the presence of liquids.

FIG. 8 shows computing device 800, demonstrating yet another embodiment in which elements of computing device 800 itself are used to sense the presence of liquids. Base housing 804 can be formed from a conductive material such as aluminum. Traces can be attached interior surfaces of base housing 804 and can allow the controller to monitor the capacitance of base housing 804. A moisture threshold can be set to allow the controller to distinguish between major liquid spills and events that do not require the controller to take action, such as minor spills, moisture, and contact between a user's hands and base housing 804. For example, region 808 can represent an area in which liquid comes in contact with base housing 804 during a major spill. The capacitance values generated by such a spill can cause the controller to take action by decoupling the system electronics from the power supply. Surfaces capable of detecting the presence of liquids can include the top, bottom, and side surfaces of base housing 804. In one embodiment, two or more of these surfaces can be formed integrally. For example, the side walls and top surface of base housing 804 can be formed from a single piece of conductive material.

In addition to base housing 804, several other components of computing device 800 can be used to sense the presence of liquids. For example, individual keys 802 from the keyboard assembly can also be formed from conductive materials and electrically connected to the controller. The controller can monitor the capacitance values across each key and can sense the presence of liquid in contact with a key when the capacitance value exceeds a pre-determined threshold. Furthermore, track pad 806 can be used to detect the presence of liquid. Many track pads are already configured to detect changes in capacitance to function as a mouse. The capacitance readings from track pad 806 can also be sent to the controller, allowing the controller to detect major spills in the region of track pad 806 when capacitance values exceed a pre-determined threshold.

Figure 9:
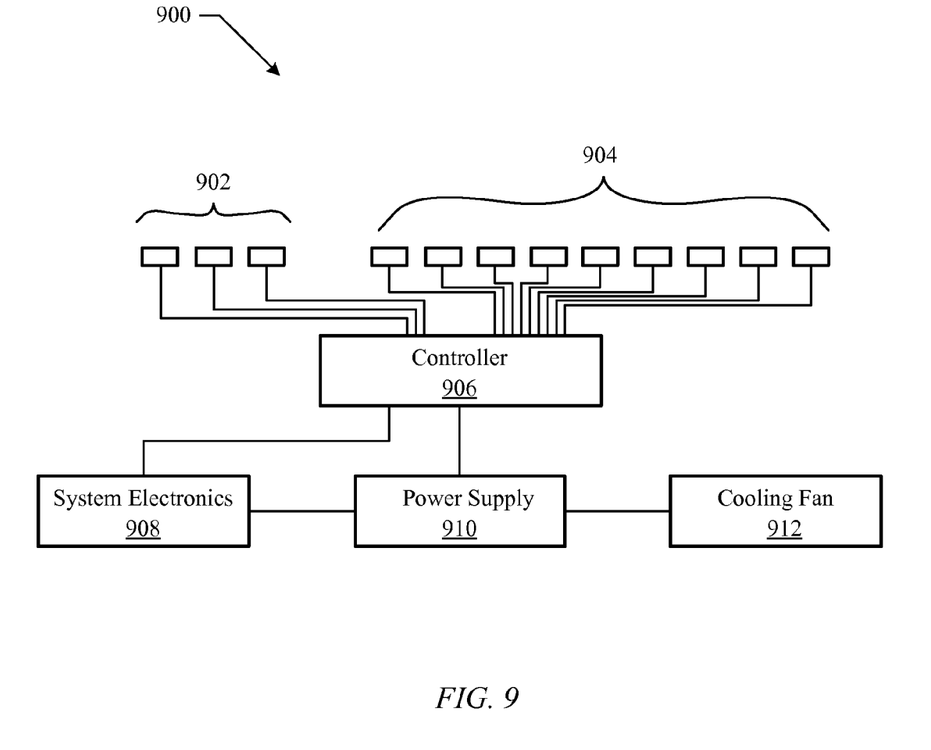
FIG. 9 shows a system for allowing a computing device to detect and respond to liquid spills.

FIG. 9 shows system 900 for detecting the presence of liquid in a computing device and responding to minimize any damage caused by the liquid. Liquid sensors 904 can represent a number of sensors located near the keyboard assembly. In one embodiment, each key in the keyboard assembly can have an associated liquid sensor located in, under, or around the key. In another embodiment, a grid of liquid sensors can be placed in or under the keyboard assembly. In yet another embodiment, elements of the keyboard assembly itself can be used to sense the presence of liquids. In addition, liquid sensors 902 can represent liquid sensors in a variety of other locations throughout the computing device. For example, liquid sensors 902 can represent sensors placed near openings for I/O ports located throughout the base housing of the computing device. In addition, liquid sensors 902 can represent sensors near other openings such as disc drives and airflow openings for cooling fans. Liquid sensors 902 and 904 can represent any number of sensors arranged in any pattern. Furthermore, liquid sensors 902 and 904 can represent a variety of different types of sensors, including capacitive sensors, resistive sensors, conductive sensors, optical sensors, or any other technically feasible sensor capable of detecting the presence of liquids.

Liquid sensors 902 and 904 can be coupled to controller 906. Controller 906 can represent an independent processor or a computer program running on other portions of the system electronics. In one embodiment, controller 906 can be located on a component of the system electronics, such as the motherboard or other circuit boards. In another embodiment, controller 906 can be located in an area of the computing device that is at least partially shielded from any liquids that may enter the computing device following a spill. This can allow the controller to function properly while other components such as the motherboard are compromised due to the spill. Controller 906 can monitor readings from liquid sensors 902 and 904 to detect the presence and severity of any spills. Furthermore, controller 906 can be electrically connected to one or both of system electronics 908 and power supply 910.

Depending on the location, size, and severity of any spills, the controller can direct the system electronics and power supply to take various actions. For example, following a minor spill, controller 906 can instruct system electronics 908 to save any data that the user is currently working with and perform a controlled shutdown of the computing device. However, in the event of a major spill, controller 906 can direct power supply 910 to immediately decouple system electronics 908 from power supply 910, decreasing the possibility of an electrical short. In one embodiment, a circuit breaker can be employed between power supply 910 and system electronics 908. The controller can instruct the power supply to trip the circuit breaker and cut all power between power supply 910 and system electronics 908 in the event of a major spill. In still another embodiment, cooling fan 912 can be powered by a separate circuit from system electronics 908. This can allow cooling fan 912 to continue to operate after system electronics 908 are decoupled from power supply 910. The cooling fan can increase airflow through the computing device, increasing the rate of evaporation for any liquids trapped in the computing device following the spill.

Figure 10:
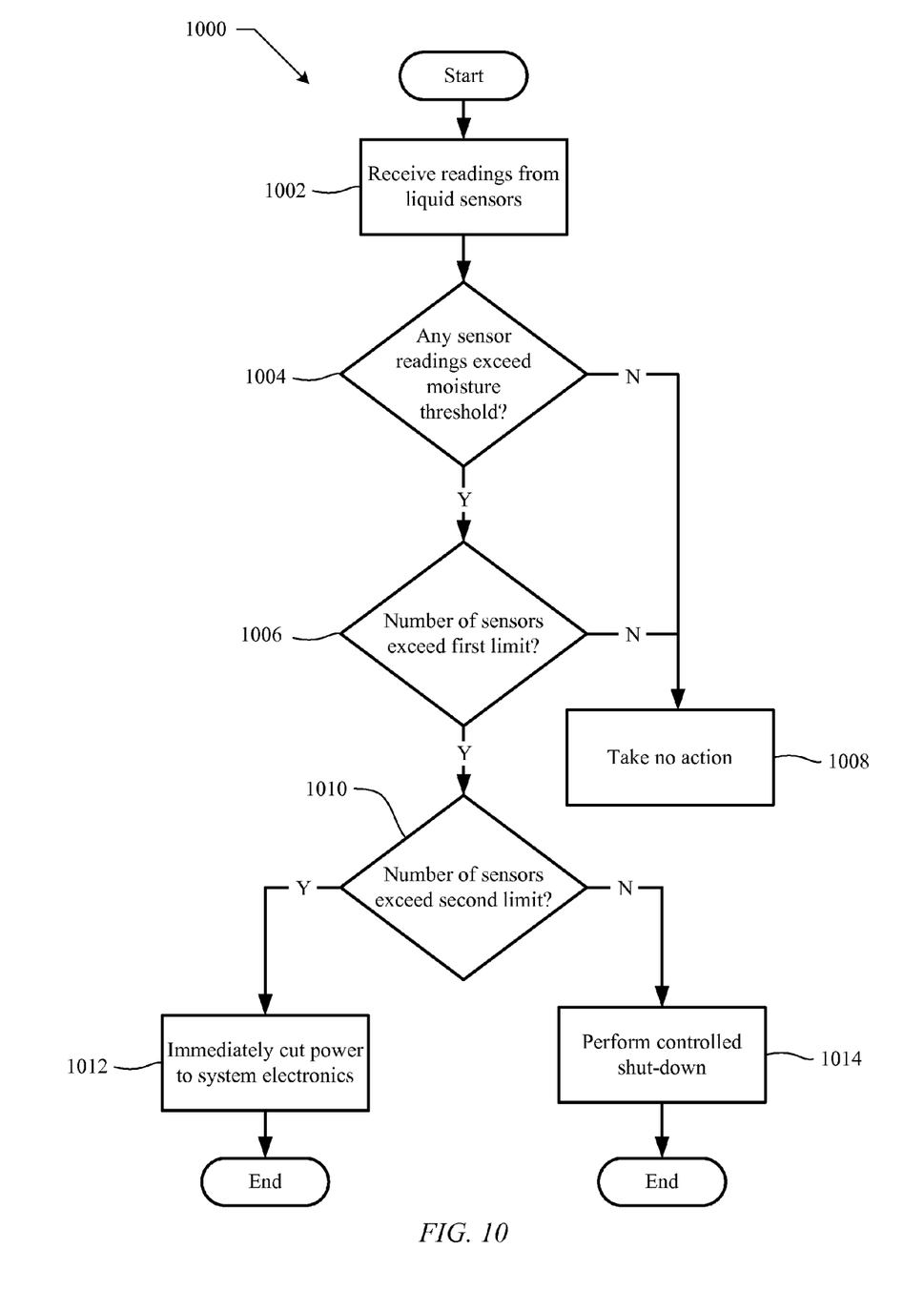
FIG. 10 shows a flowchart detailing a process for detecting and responding to liquid spills.

FIG. 10 shows a flowchart depicting process 1000, demonstrating how controller 906 can respond to a variety of spill events. In step 1002, the controller can receive readings from a variety of liquid sensors located throughout the computing device. For example, the readings can represent the capacitance values for a number of capacitive sensors or any other technically feasible reading that can indicate the presence of liquid from a variety of liquid sensors. In step 1004, controller 906 can determine whether readings from any of the liquid sensors exceed a moisture threshold. The moisture threshold can allow the controller to respond to spill events while ignoring any changes in capacitance resulting from atmospheric moisture, contact with the user's hands, or very minor spills that do not represent a danger to the computing device. If none of the readings from any of the liquid sensors exceeds the moisture threshold, then controller 906 can proceed to step 1008 and take no action.

However, if one or more of the liquid sensors exceeds the moisture threshold, then controller 906 can proceed to step 1006. In step 1006, the controller can determine whether the number of liquid sensors exceeding the moisture threshold surpasses a first limit. For example, in one embodiment, the first limit can be set at two liquid sensors. In this case, when only one liquid sensor exceeds the moisture threshold, the first limit is not reached and controller 906 can take no action under step 1008. The first limit can vary depending on the density of sensors and susceptibility of underlying system electronics to varying quantities of liquid. In one embodiment, the first limit can vary in different regions of the computing device. For example, the first limit can be relatively low in a region of the computing device housing critical system electronics such as a motherboard or CPU. Conversely, the first limit can be set relatively high in regions of the computing device housing less critical system components such as an optical drive. Controller 906 can also distinguish between disparate and adjacent sensors when determining whether the first limit has been reached. For example, in one embodiment, the first limit can be reached when the corresponding number of sensors exceeds the moisture threshold anywhere throughout the computing device. In another embodiment, the first limit can only be reached when a group of adjacent sensors exceed the moisture limit.

When the first limit is exceeded, controller 906 can proceed to step 1010 and determine whether the number of liquid sensors exceeding the moisture threshold exceeds a second limit. The second limit can determine whether the controller responds to the spill event by immediately decoupling the system electronics from the power supply or directing the system electronics to perform a controlled shutdown, saving any data that the user is currently working with. The second limit is generally higher than the first limit. However, in some embodiments, the first and second limits can be set to the same value and steps 1006 and 1010 can be collapsed into a single step. Similar to step 1006, the second limit in step 1010 can vary in different regions of the computing device. In addition, the second limit can be applied to a total number of liquid sensors exceeding the moisture threshold or a number of adjacent liquid sensors exceeding the moisture threshold. When the second limit is exceeded, controller 906 can proceed to step 1012 and immediately decouple the system electronics from the power supply. In one embodiment, this can be accomplished by tripping a circuit breaker between the power supply and the system electronics. In the event that the first limit is exceeded but the second limit is not reached, controller 906 can proceed to step 1014 and perform a controlled shutdown of the computing device. This can allow the system electronics to save any data that the user is currently working with so that the data is not lost when the computing device is powered back on.

In one embodiment, both steps 1012 and 1014 can include the additional step of recording an event log prior to decoupling the system electronics from the power supply. This event log can include a variety of information including the time of the spill event, the number and location of the liquid sensors that exceeded the moisture threshold during the spill event, or any other relevant information. Furthermore, the event log can assist technicians in repairing any damage to the computing device. In addition, the information contained in the event log can assist a manufacturer or technician in determining whether any necessary repairs are covered under a warranty that does not cover damage resulting from spilled liquids. In still another embodiment, the computing device can use any available internet connection to send a message to a server controlled by the manufacturer of the computing device or another entity prior to decoupling the system electronics from the power supply. This message can include some or all of the information provided in the event log and can allow the manufacturer to assist the user in repairing any damage to the computing device following the spill.

Figure 11:
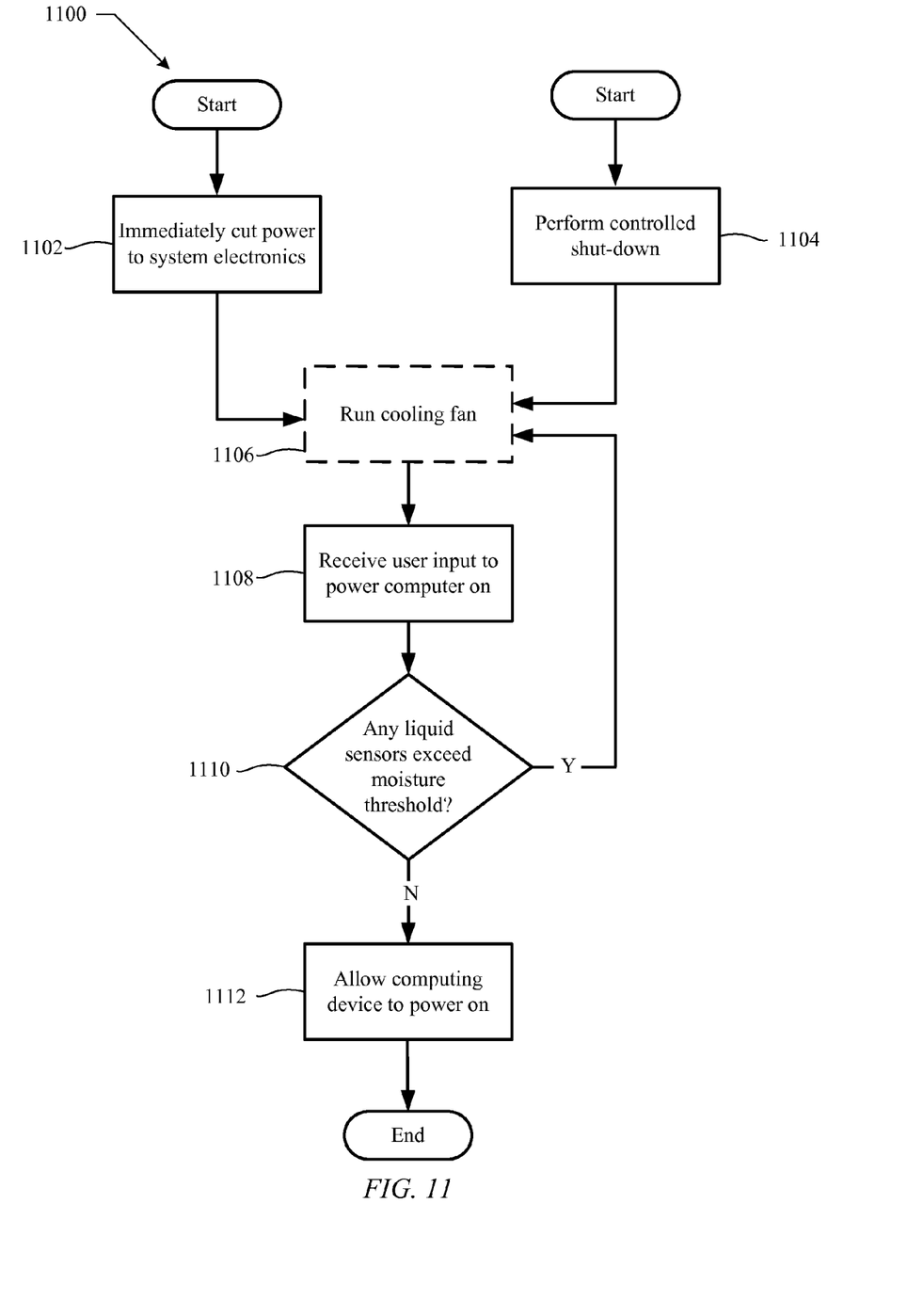
FIG. 11 shows a flowchart detailing a process for limiting the ability of a user to reactivate a computing device following a liquid spill.

FIG. 11 shows a flowchart depicting process 1100, demonstrating how controller 906 can limit the ability of a user to reactivate the computing device following a spill event. Process 1100 can begin when controller 906 responds to a spill event by immediately decoupling the system electronics from the power supply in step 1102 or performing a controlled shut-down in step 1104. In some embodiments, controller 906 can receive power from the power supply or a different power source using a different circuit than the system electronics, allowing controller 906 to continue functioning following a spill. If this is the case, it can be advantageous to position the controller within a region of the computing device that is protected from any liquids that may enter the computing device following a spill. This can allow controller 906 to continue functioning after the system electronics are powered off. In some embodiments, a cooling fan included in the computing device can also be powered using a separate circuit from the system electronics. This can allow the cooling fan to increase the rate of evaporation for any liquids remaining in the computing device following a spill. In optional step 1106, the controller can first cause the cooling fan to run while continuing to monitor which liquid sensors exceed the moisture threshold.

Next, in step 1108, controller 906 can await an input from the user indicating that the user wishes to reactivate the computing device. For example, the user can depress a power button on the computing device. In step 1110, following the user input, the controller can determine whether any of the liquid sensors still exceed the moisture threshold. In the event that one or more liquid sensors still detect the presence of liquids, the controller can continue to prevent the power supply from providing power to the system electronics and return to step 1106. However, if no liquid sensors exceed the moisture threshold at the time the user input is received, then the controller can proceed to step 112 and allow the power supply to provide power to the system electronics and restart the computing device.

Figure 12:
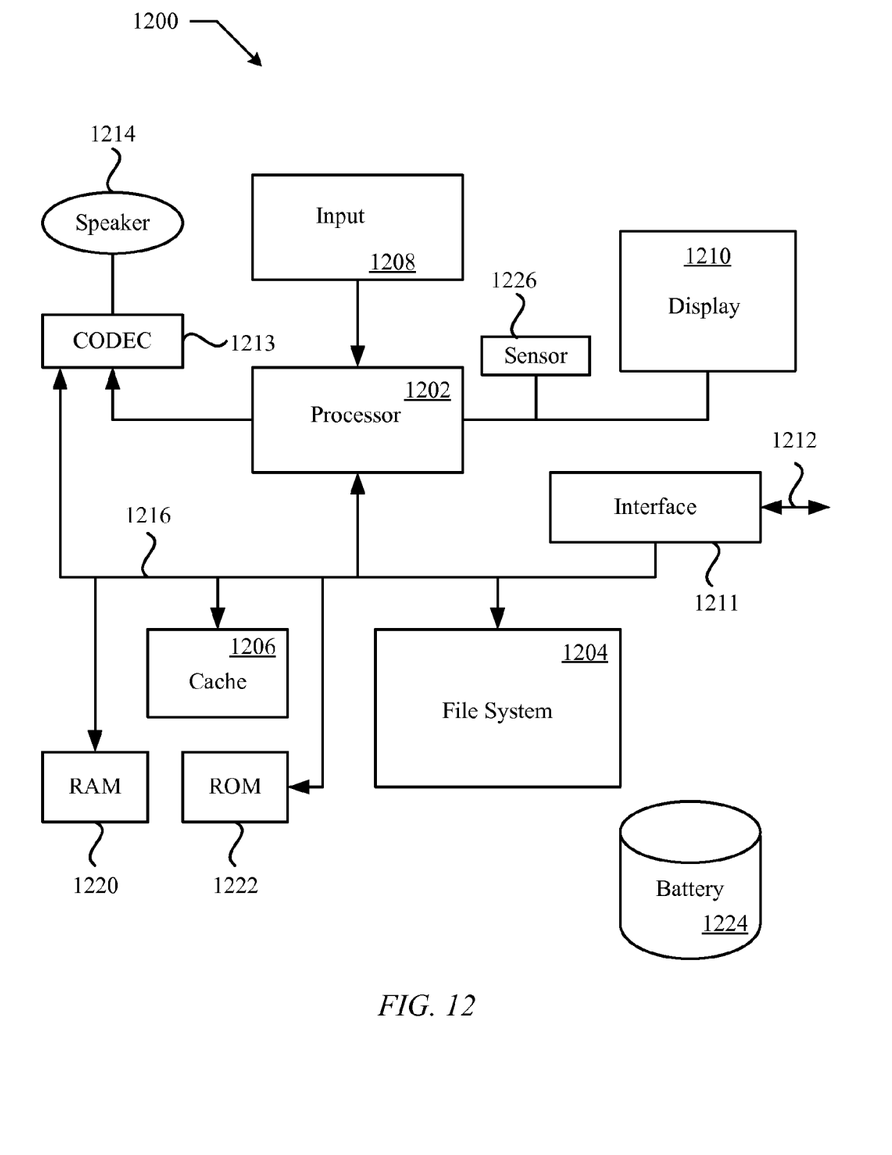
FIG. 12 shows a block diagram of a representative computing device.

In some embodiments, the controller and system electronics can represent the components of a typical computer. FIG. 12 illustrates a block diagram of computer 1200 capable of controlling some of the processes in the described embodiments. Computer 1200 includes a processor 1202 that pertains to a microprocessor or controller for controlling the overall operation of computer 1200. Computer 1200 contains instruction data pertaining to operating instructions in a file system 1204 and a cache 1206. The file system 1204 is, typically, a storage disk or a plurality of disks. The file system 1204 typically provides high capacity storage capability for the computer 1200. However, since the access time to the file system 1204 is relatively slow, the computer 1200 can also include a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The power consumption is often a concern when the computer 1200 is a portable device that is powered by a battery 1224. The computer 1200 can also include a RAM 1220 and a Read-Only Memory (ROM) 1222. The ROM 1222 can store programs, utilities or processes to be executed in a non-volatile manner. The RAM 1220 provides volatile data storage, such as for cache 1206.

The computer 1200 also includes a user input device 1208 that allows a user of the controller 1200 to interact with the computer 1200. For example, the user input device 1208 can take a variety of forms, such as a button, keypad, dial, touch screen, audio input interface, visual/image capture input interface, input in the form of sensor data, etc. Still further, the computer 1200 includes a display 1210 (screen display) that can be controlled by the processor 1202 to display information to the user. A data bus 1216 can facilitate data transfer between at least the file system 1204, the cache 1206, the processor 1202, and a CODEC 1213. The CODEC 1213 can be used to decode and play a plurality of media items from file system 1204 that can correspond to certain activities taking place during a particular process. The processor 1202, upon a certain event occurring, supplies the media data (e.g., audio file) for the particular media item to a coder/decoder (CODEC) 1213. The CODEC 1213 then produces analog output signals for a speaker 1214. The speaker 1214 can be a speaker internal or external to the computer 1200. For example, headphones or earphones that connect to the computer 1200 would be considered an external speaker.

The computer 1200 also includes a network/bus interface 1211 that couples to a data link 1212. The data link 1212 allows the computer 1200 to couple to a host computer or to accessory devices. The data link 1212 can be provided over a wired connection or a wireless connection. In the case of a wireless connection, the network/bus interface 1211 can include a wireless transceiver. The media items can be any combination of audio, graphical or visual content. Sensor 1226 can take the form of circuitry for detecting any number of stimuli. For example, sensor 1226 can include any number of sensors for monitoring a manufacturing operation such as for example a liquid sensor, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device, comprising:
   a base housing enclosing at least one electronic component, wherein the base housing includes a plurality of openings;
   a keyboard assembly disposed at least partially within at least one of the plurality of openings;
   a plurality of liquid sensors disposed near the plurality of openings, wherein the liquid sensors are configured to detect liquid entering the base housing through one or more of the plurality of openings; and
   a controller electrically coupled to the liquid sensors, wherein the controller is configured to electrically decouple the at least one electronic component from a power supply when a number of liquid sensors exceeding a moisture threshold exceeds a first limit.

2. The computing device as recited in claim 1, wherein the plurality of liquid sensors operate by measuring a capacitance of at least one of the plurality of openings.

3. The computing device as recited in claim 1, the keyboard assembly further comprising:
   a flexible membrane including an upper layer, a lower layer, and a plurality of cavities disposed between the upper layer and the lower layer;
   a plurality of electrodes disposed on interior surfaces of the upper and lower layers, wherein the electrodes are configured to complete a circuit when one of the plurality of cavities is collapsed by a force imparted from a corresponding key; and
   a plurality of openings in the upper layer providing access to each of the cavities, wherein the plurality of openings in the upper layer allows any liquid spilled near the keyboard assembly to enter the plurality of cavities;
   wherein the plurality of electrodes are electrically coupled to the controller and the controller detects whether liquid is present in any one of the plurality of cavities by measuring a capacitance between the electrodes.

4. The computing device as recited in claim 1, wherein the plurality of liquid sensors are disposed along an interior edge created by each of the plurality of openings in the base housing.

5. The computing device as recited in claim 1, wherein the controller is further configured to decouple the power supply from the at least one electronic component when the number of liquid sensors exceeding the moisture threshold exceeds a second limit.

6. The computing device as recited in claim 5, wherein the controller is further configured to direct the at least one electronic component to save a user's data and perform a controlled shutdown when the number of liquid sensors exceeding the moisture threshold exceeds the first limit but does not exceed the second limit.

7. The computing device as recited in claim 6, wherein the controller is further configured to prevent a user from reactivating the computing device until none of the plurality of liquid sensors exceed the moisture threshold.

8. The computing device as recited in claim 7, further comprising a cooling fan electrically coupled to the power supply by a circuit separate from the at least one electronic component, wherein the controller directs the power supply to continue supplying power to the cooling fan after the at least one electronic component is decoupled from the power supply.

9. The computing device as recited in claim 6, wherein the first limit and second limit vary across the computing device depending on a susceptibility of underlying electronic components to damage from liquids.

10. A method for detecting and responding to the presence of liquids in a computing device, the method comprising:
provide a plurality of liquid sensors disposed near openings in a base housing of the computing device;
electrically coupling the plurality of liquid sensors to a controller;
monitoring each of the plurality of liquid sensors to detect when one or more of the plurality of liquid sensors exceeds a moisture threshold;
determining whether a number of liquid sensors exceeding the moisture threshold exceeds a first limit;
determining whether the number of liquid sensors exceeding the moisture threshold exceeds a second limit;
in the event that the number of liquid sensors exceeding the moisture threshold exceeds the second limit, immediately decoupling any system electronics from a power supply; and
in the event that the number of liquid sensors exceeding the moisture threshold exceeds the first limit but not the second limit, saving any data that a user of the computing device is working with and performing a controlled shutdown of the computing device.

11. The method as recited in claim 10, further comprising:
after the system electronics are decoupled from the power supply, continuing to monitor each of the plurality of liquid sensors; and
allowing the user to reactivate the computing device only when none of the plurality of liquid sensors exceed the moisture threshold.

12. The method as recited in claim 10, further comprising:
prior to decoupling the system electronics from the power supply, recording an event log including a number and a location of liquid sensors exceeding the moisture threshold.

13. The method as recited in claim 12, further comprising:
in an event that the computing device is connected to the internet, sending the event log to a server prior to decoupling the system electronics from the power supply.

14. The method as recited in claim 11, further comprising:
providing a cooling fan coupled to the power supply by a separate circuit from the system electronics; and
providing power to the cooling fan following a shutdown resulting from a spill, wherein the cooling fan increases airflow through the computing device, increasing a rate of evaporation for any liquids present.

15. The method as recited in claim 10, wherein the first limit and second limit vary across the computing device depending on a susceptibility of underlying electronic components to damage from liquids.

16. The method as recited in claim 10, wherein the first and second limits are reached only when a number of adjacent liquid sensors exceeding the moisture threshold exceeds the first and second limits.

17. Non-transient computer readable medium for storing computer code executable by a processor in a computer system capable of detecting and responding to a presence of liquids in a computing device, the computer readable medium comprising:
computer code for monitoring each of a plurality of liquid sensors to detect when one or more of the plurality of liquid sensors exceeds a moisture threshold;
computer code for determining whether a number of liquid sensors exceeding the moisture threshold exceeds a first limit;
computer code for determining whether the number of liquid sensors exceeding the moisture threshold exceeds a second limit;
computer code for immediately decoupling any system electronics from a power supply in the event that the number of liquid sensors exceeding the moisture threshold exceeds the second limit; and
computer code for saving any data that a user of the computing device is working with and performing a controlled shutdown of the computing device in an event that the number of liquid sensors exceeding the moisture threshold exceeds the first limit but not the second limit.

18. The non-transient computer readable medium as recited in claim 17, further comprising:
computer code for continuing to monitor each of the plurality of liquid sensors after the system electronics are decoupled from the power supply; and
computer code for preventing the user of the computing device from reactivating the computing device until none of the plurality of liquid sensors exceed the moisture threshold.

19. The non-transient computer readable medium as recited in claim 17, further comprising computer code for recording an event log including a number and a location of liquid sensors exceeding the moisture threshold prior to decoupling the system electronics from the power supply.

20. The non-transient computer readable medium as recited in claim 19, further comprising computer code for using any available internet connection to send the event log to a server prior to decoupling the system electronics from the power supply.

21. A system for detecting and responding to a presence of liquids in a computing device, the system comprising:
a plurality of capacitive liquid sensors distributed throughout the computing device;
system electronics contained within the computing device;
a power supply electrically coupled to the system electronics; and
a controller electrically coupled to the plurality of capacitive liquid sensors, the power supply, and the system electronics, wherein the controller is configured to electrically decouple the system electronics from the power supply when a number of liquid sensors exceeding a moisture threshold exceeds a first limit.

22. The system as recited in claim 21, wherein the controller is further configured to immediately decouple the power supply from the system electronics when the number of liquid sensors exceeding the moisture threshold exceeds a second limit.

23. The system as recited in claim 22, wherein the controller is further configured to direct the system electronics to save a user's data and perform a controlled shutdown when the number of liquid sensors exceeding the moisture threshold exceeds the first limit but does not exceed the second limit.

24. The system as recited in claim 23, wherein the controller is further configured to prevent a user from reactivating the computing device until none of the plurality of liquid sensors exceed the moisture threshold.

25. The system as recited in claim 24, further comprising a cooling fan electrically coupled to the power supply by a circuit separate from the at least one electronic component, wherein the controller directs the power supply to continue supplying power to the cooling fan after the system electronics are decoupled from the power supply.

\* \* \* \* \*